United States Patent [19]

Spencer et al.

[11] 3,808,014

[45] Apr. 30, 1974

[54] REFRACTORY MAGNESIA

[75] Inventors: Denzil Reginald Frank Spencer, Oldcotes, near Worksop; David Clifford Wooldridge, Worksop, both of England

[73] Assignee: Steetley (Mfg.) Limited, Gateford Hill, Worksop, England

[22] Filed: Jan. 31, 1973

[21] Appl. No.: 328,490

[30] Foreign Application Priority Data

Feb. 11, 1972 Great Britain .................... 6473/72

[52] U.S. Cl. .................................... 106/57, 106/58
[51] Int. Cl. ..................... C04b 35/04, C04b 35/48
[58] Field of Search ................................ 106/57, 58

[56] References Cited
UNITED STATES PATENTS 2,695,242  11/1954  Woodward ........................... 106/58
3,312,557  4/1967  Havranek et al. ..................... 106/58

Primary Examiner—James E. Poer

[57] ABSTRACT

A refractory dead-burned magnesia comprises lime, silica in an amount less than 0.2 percent by weight, based on the weight of the magnesia, $R_2O_3$ materials in an amount less than 0.5 percent by weight, based on the weight of the magnesia and zirconia in an amount of from 0.05 percent to 5 percent by weight, based on the weight of the magnesia, the amount of lime in the magnesia being from 0.2 percent to 1.5 percent by weight, based on the weight of the magnesia, in excess of the weight of lime required to ensure a $CaO:ZrO_2$ mole ratio of 1:1.

The magnesia in accordance with the invention has utility in the production of high hot strength refractory products.

9 Claims, No Drawings

REFRACTORY MAGNESIA

The present invention relates to refractory magnesia compositions.

With improved processing techniques, the synthetic magnesias available for use in the refractories industry are becoming increasingly pure. It is however, at these high purities that the type and proportion of impurity becomes of critical importance if a magnesia of optimum refractory properties is to be obtained. The present invention is concerned with those magnesias which contain less than 0.2 percent by weight $SiO_2$, less than 0.5 percent desirably less than 0.2 percent by weight of $R_2O_3$ materials and, compared with these levels, significant amounts of CaO. It has been found that relatively pure magnesias of this type are susceptible to slag attack. It is as an attempt to obviate this shortcoming that the present invention is directed.

Accordingly the present invention provides a refractory dead-burned magnesia containing lime, silica in an amount of less than 0.2 percent, preferably from 0.01 percent to 0.1 percent, by weight, based on the weight of the magnesia, $R_2O_3$ materials in an amount of less than 0.5 percent, preferably from 0.01 percent to 0.2 percent, by weight, based on the weight of the magnesia, and zirconia in an amount of from 0.05 percent to 5 percent, preferably of from 0.2 percent to 2 percent, by weight, based on the weight of the magnesia, the amount of lime in the magnesia being from 0.2 percent to 1.5 percent, preferably from 0.2 percent to 1.0 percent, by weight, based on the weight of the magnesia, in excess of the weight of lime required to ensure a $CaO:ZrO_2$ mole ratio of 1:1.

The expression "$R_2O_3$ materials" as used in this specification has its usual significance in the refractories art referring predominantly to materials of the group $Al_2O_3$, $Fe_2O_3$, $Cr_2O_3$, $B_2O_3$ and $Mn_2O_3$.

Desirably the amount of alumina in the magnesia of the present invention is in the range 0.01 percent to 0.07 percent by weight based on the weight of magnesia, although more alumina can be tolerated if the lime content is very low. Desirably the amount of ferric oxide in the magnesia of the present invention is in the range 0.01 percent to 0.20 percent by weight on the weight of magnesia. Desirably the amount of boric oxide is less than 0.05 percent by weight, preferably from 0.005 percent to 0.03 percent by weight. In general, the amount of $R_2O_3$ materials is as small as possible.

The present invention also includes dead-burned magnesia grain containing or consisting of the above magnesia, refractory bricks, blocks and shapes, bonding mortars, ramming and casting mixes made from the magnesia or grain, and refractory linings of furnaces and the like when made wholly or in part from such magnesia or magnesia grain or from such bricks, blocks, shapes, bonding mortars, ramming or casting mixes.

Dead-burned magnesia in accordance with the invention may be obtained by dead-burning a mixture of caustic magnesia of appropriate analysis and any necessary additives, or in the case of the grain product, by pelletising a mixture of caustic magnesia of appropriate analysis and any necessary additives and dead-burning the pellets.

The caustic magnesia from which the magnesia of the present invention is derived may be obtained by treatment of naturally occurring minerals or from sea-water, brines, and the like. It may be necessary to purify the magnesia obtained from these sources or it may be necessary to add certain materials such as lime in order to achieve the required proportions of contaminating ions. It will of course, be necessary to add zirconia. One suitable source of magnesia is that obtained by the process described in our copending U.K. Patent Application No. 47048/71.

Boron may be removed from the magnesia by burning in the presence of an alkali metal carbonate.

Zirconia may be incorporated into the caustic magnesia, prior to dead-burning, by adding zirconia itself or by adding a compound of zirconium which yields zirconia upon dead-burning. Suitable zirconium compounds include zirconium carbonate, zirconium ammonium carbonate, zirconium sodium carbonate, zirconium hydroxide, zirconium sulphate, zirconium nitrate and the like.

The caustic magnesia from which the magnesia of the present invention is derived preferably has an analysis within the following specification:

| | | | |
|---|---|---|---|
| CaO | 0.3% | to | 1.5% |
| $SiO_2$ | 0.01% | to | 0.1% |
| $Al_2O_3$ | 0.01% | to | 0.05% |
| $Fe_2O_3$ | 0.01% | to | 0.1% |
| $B_2O_3$ | 0.005% | to | 0.3% |
| $Mn_2O_3$ | 0.005% | to | 0.1% |
| MgO | 98% | to | 99.5% |
| Others | 0.001% | to | 0.01% |

Other refractory materials may be included with the mixture of caustic magnesia and zirconia provided they are of adequate purity and preferably do not contribute any silica to the mixture. In this connection zircon, which contains silica, is generally not suitable as a zirconium compound for use in the present invention.

The mixing of caustic magnesia and any optional or necessary additives such as zirconia may be effected using any convenient mixing operation, for example, by using a tumble, paddle, muller, screw or turbine mixer or by impact mixing using for example a hammer cage, jet or attrition mill.

Pelletisation may be carried out by feeding the mixture containing caustic magnesia to a suitable pelletiser and compressing the powder at a pressure above 5 tons per square inch, preferably from 20 to 40 tons per square inch, whereby a pellet having a bulk density preferably in the range 1.75 to 2.1 grams/cc. is obtained. The pellets are desirably of a size falling within the range 0.25 inches to 1 inch. A suitable pelletiser consists of a pair of rotating rollers to the nip of which the mixture containing caustic magnesia is fed. The surface of the rollers may be recessed so as to form shapes of the mixture of a suitable size.

The mixture containing caustic magnesia may be compacted into shapes by means other than pelletisation. For instance the mixture may be isostatically pressed or extruded.

The dead-burning operation of the mixture containing caustic magnesia, possibly compressed, may be carried out in any suitable kiln or furnace which is capable of raising the temperature of the mixture to a level within the range 1,600°C. to 2,000°C., desirably 1,800°C. and above, and of maintaining the mixture within this range for a time sufficient to ensure the formation of a non-active magnesia containing calcium zirconate, for example, from 5 to 15 hours.

The refractory shape product may be obtained by shaping particles of the caustic magnesia or the grain product and firing the resulting shape at a temperature in the range 1500°C. to 1850°C. The magnesia or magnesia grain is preferably graded into a batch suitable for making the shape, containing 65 to 75 percent of particles between 5 and 72 BSS mesh and 25 to 35 percent of particles passing a 72 BSS mesh. The part of the batch passing the 72 BSS mesh is prepared by ball milling to a specific surface area preferably between 0.20 and 0.30 metres squared per gram. If necessary the magnesia may be mixed with a binder such as sulphite lye, starches, tars, pitches etc. When the batch has been thoroughly mixed it is pressed in a mould at a pressure of approximately 8 tons per square inch. The batch may alternatively be isostatically pressed. The pressed shapes may then be fired at a temperature in the range 1,500°C. to 1,850°C. to develop a ceramic bond. The time at temperature is desirably from 3 to 15 hours and the rate at which the shapes are raised to temperature is preferably no greater than 300°C. per hour.

The following Examples 1 to 9 are given to illustrate the present invention and Examples 10 to 15 are included for the purposes of comparison. In each of these Examples, grain has been prepared by compacting a mixture of fine magnesia of the appropriate chemical quality and zirconia into prismatic test bars and firing at 1,650°C. for 1 hour to densities in the 3.20 to 3.35 g/ml range. Different firing temperatures can be employed. The object of using the 1,650°C. temperature was to produce grain densities similar to those found in commercial magnesia grains. After firing, the prismatic grain test bars were surface ground to 6.4 × 6.4 × 40.6 mms. and tested on a modulus of rupture apparatus at temperatures up to 1600°C.

Strengths were calculated from the standard formula, $$(3PL/2bd^2)$$

where $P$ is the fracture load, $L$ the span between the lower two knife edges, $b$ the breadth and $d$ the depth of the test specimen. The load was applied at a constant rate of 500 psi per minute. The depth of specimen to the span between the lower two knife edges ($d/L$) was 1:5 i.e. similar to that used when testing the normal 6 × 1 × 1 ins. brick specimens.

The results are given in the following Table from which it is observed that the test bars of Examples 1 to 9 produced from magnesias in accordance with the invention exhibit superior moduli of rupture values at 1,500°C and 1,600°C as compared with the strengths of the test bars of Examples 10 to 15 which were produced from magnesias falling outside the scope of the present invention.

TABLE

| EXAMPLE No. | CHEMICAL ANALYSIS (Wt. %) | | | | | | | | | MODULUS OF RUPTURE GRAIN STRENGTH (MN/m²) AT | |
|---|---|---|---|---|---|---|---|---|---|---|---|
| | CaO | ZrO₂ | SiO₂ | Al₂O₃ | Fe₂O₃ | Cr₂O₃ | B₂O₃ | MgO | Excess CaO | 1500°C | 1600°C |
| 1 | 0.8 | 0.10 | 0.09 | 0.06 | 0.06 | 0.05 | 0.012 | 98.83 | 0.75 | 90 | 64 |
| 2 | 0.53 | 0.50 | 0.11 | 0.07 | 0.08 | 0.03 | 0.01 | 98.67 | 0.3 | 86 | 37 |
| 3 | 0.83 | 0.50 | 0.12 | 0.03 | 0.02 | 0.03 | 0.01 | 98.46 | 0.6 | 101 | 68 |
| 4 | 1.13 | 0.50 | 0.07 | 0.04 | 0.02 | 0.03 | 0.01 | 98.20 | 0.9 | 97 | 65 |
| 5 | 0.76 | 1.00 | 0.11 | 0.03 | 0.05 | 0.02 | 0.01 | 98.22 | 0.3 | 58 | 23 |
| 6 | 1.06 | 1.00 | 0.13 | 0.04 | 0.03 | 0.02 | 0.01 | 97.71 | 0.6 | 72 | 65 |
| 7 | 1.36 | 1.00 | 0.09 | 0.02 | 0.05 | 0.02 | 0.01 | 97.45 | 0.9 | 67 | 61 |
| 8 | 1.51 | 2.00 | 0.10 | 0.02 | 0.08 | 0.02 | 0.01 | 96.26 | 0.6 | 78 | 68 |
| 9 | 2.88 | 5.00 | 0.09 | 0.03 | 0.04 | 0.02 | 0.01 | 91.93 | 0.6 | 77 | 65 |
| 10 | 0.23 | 0.50 | 0.10 | 0.03 | 0.04 | 0.04 | 0.01 | 99.05 | 0.0 | 11 | 9 |
| 11 | 0.46 | 1.00 | 0.09 | 0.02 | 0.03 | 0.03 | 0.01 | 98.36 | 0.0 | 12 | 12 |
| 12 | 0.68 | 1.50 | 0.11 | 0.04 | 0.02 | 0.03 | 0.01 | 97.61 | 0.0 | 12 | 12 |
| 13 | 0.91 | 2.00 | 0.11 | 0.05 | 0.02 | 0.02 | 0.01 | 96.88 | 0.0 | 12 | 11 |
| 14 | 1.37 | 3.00 | 0.13 | 0.03 | 0.02 | 0.02 | 0.01 | 95.42 | 0.0 | 12 | 10 |
| 15 | 2.28 | 5.00 | 0.12 | 0.03 | 0.02 | 0.02 | 0.01 | 92.52 | 0.0 | 13 | 9 |

* excess CaO is that above the requirement to form a 1:1 CaO/ZrO₂ molecular ratio

We claim:

1. A refractory dead-burned magnesia containing lime, silica in an amount less than 0.2 percent by weight, based on the weight of the magnesia, $R_2O_3$ materials in an amount less than 0.5 percent by weight, based on the weight of the magnesia, and zirconia in an amount of from 0.05 percent to 5 percent by weight, based on the weight of the magnesia, the amount of lime in the magnesia being from 0.2 percent to 1.5 percent by weight, based on the weight of the magnesia, in excess of the weight of lime required to ensure a $CaO:ZrO_2$ mole ratio of 1:1.

2. Magnesia according to claim 1 containing from 0.01 percent to 0.1 percent by weight of silica.

3. Magnesia according to claim 1 containing from 0.01 percent to 0.2 percent by weight of $R_2O_3$ materials.

4. Magnesia according to claim 1 containing from 0.2 percent to 2 percent by weight of zirconia.

5. Magnesia according to claim 1 containing from 0.2 percent to 1.0 percent by weight of lime in excess of the weight of lime required to ensure a $CaO:ZrO_2$ mole ratio of 1:1.

6. Magnesia according to claim 1 containing alumina in an amount of from 0.01 percent to 0.07 percent by weight, based on the weight of the magnesia.

7. Magnesia according to claim 1 containing ferric oxide in an amount of from 0.01 percent to 0.20 percent by weight, based on the weight of the magnesia.

8. Magnesia according to claim 1 containing boric oxide in an amount less than 0.05 percent by weight, based on the weight of the magnesia.

9. Magnesia according to claim 1 containing from 0.2 percent to 1.0 percent by weight of lime in excess of the weight of lime required to ensure a $CaO:ZrO_2$ mole ratio of 1:1, from 0.01 percent to 0.1 percent by weight of silica, from 0.2 percent to 2 percent by weight of zirconia, from 0.01 percent to 0.07 percent by weight of alumina, from 0.01 percent to 0.20 percent by weight of ferric oxide and from 0.005 percent to 0.03 percent by weight of boric oxide.

* * * * *